US012135032B2

(12) United States Patent
Tsuchiya et al.

(10) Patent No.: US 12,135,032 B2
(45) Date of Patent: Nov. 5, 2024

(54) SCREW COMPRESSOR HAVING WORKING CHAMBER CLOSING MEMBER TO REGULATE SUCTION WORKING MEDIUM FLOW TO A WORKING CHAMBER

(71) Applicant: Hitachi Industrial Equipment Systems Co., Ltd., Tokyo (JP)

(72) Inventors: Takeshi Tsuchiya, Tokyo (JP); Kotaro Chiba, Tokyo (JP); Shuhei Nagata, Tokyo (JP); Shigeyuki Yorikane, Tokyo (JP); Kenji Morita, Tokyo (JP); Yuta Kajie, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/273,850

(22) PCT Filed: Mar. 28, 2022

(86) PCT No.: PCT/JP2022/015167
§ 371 (c)(1),
(2) Date: Jul. 24, 2023

(87) PCT Pub. No.: WO2022/224727
PCT Pub. Date: Oct. 27, 2022

(65) Prior Publication Data

US 2024/0068475 A1 Feb. 29, 2024

(30) Foreign Application Priority Data

Apr. 22, 2021 (JP) ................................. 2021-072268

(51) Int. Cl.
*F04C 29/12* (2006.01)
*F04C 18/08* (2006.01)
(Continued)

(52) U.S. Cl.
CPC .............. *F04C 29/12* (2013.01); *F04C 18/16* (2013.01); *F04C 18/08* (2013.01); *F04C 18/084* (2013.01);
(Continued)

(58) Field of Classification Search
CPC .......... F04C 29/12; F04C 18/16; F04C 18/08; F04C 18/084; F04C 29/00; F04C 2240/20;
(Continued)

(56) References Cited

U.S. PATENT DOCUMENTS

2020/0386229 A1* 12/2020 Chiba ..................... F04C 29/04

FOREIGN PATENT DOCUMENTS

CN 201891606 U 7/2011
JP 08074764 A * 3/1996
(Continued)

OTHER PUBLICATIONS

English Machine Translation of CN201891606U translated by USPTO Fit datebase on Jan. 27, 2024 (Year: 2011).*
(Continued)

*Primary Examiner* — Dominick L Plakkoottam
*Assistant Examiner* — Paul W Thiede
(74) *Attorney, Agent, or Firm* — Crowell & Moring LLP

(57) ABSTRACT

A screw compressor for compressing a working medium sucked through a suction opening and discharging the compressed working medium through a delivery opening, wherein the screw compressor includes: a male rotor and a female rotor that rotate while meshing with each other; a casing that houses the male rotor and the female rotor and is provided with a bore which forms a working chamber designed, together with the male rotor and the female rotor, to compress the working medium; a drive unit that rotationally drives at least one of the male rotor and the female rotor;
(Continued)

a working chamber closing unit that forms a suction port for sucking the working medium into the working chamber and closes the working chamber when the working chamber reaches a specified capacity; and a suction space that connects the suction opening and the suction port to allow communication therebetween.

8 Claims, 9 Drawing Sheets

(51) Int. Cl.
*F04C 18/16* (2006.01)
*F04C 29/00* (2006.01)
*F25B 1/047* (2006.01)

(52) U.S. Cl.
CPC .......... *F04C 29/00* (2013.01); *F04C 2240/20* (2013.01); *F04C 2240/30* (2013.01); *F04C 2240/40* (2013.01); *F04C 2240/80* (2013.01); *F05B 2260/4031* (2013.01); *F25B 1/047* (2013.01)

(58) Field of Classification Search
CPC .............. F04C 2240/30; F04C 2240/40; F04C 2240/80; F05B 2260/4031; F25B 1/047
See application file for complete search history.

(56) References Cited

FOREIGN PATENT DOCUMENTS

| | | | | |
|---|---|---|---|---|
| JP | 2016-8509 | A | 1/2016 | |
| WO | WO-2009148884 | A2 * | 12/2009 | ............ F04C 18/165 |
| WO | WO-2022224727 | A1 * | 10/2022 | |

OTHER PUBLICATIONS

International Search Report (PCT/ISA/210) issued in PCT Application No. PCT/JP2022/015167 dated May 24, 2022 with English translation (4 pages).
Japanese-language Written Opinion (PCT/ISA/237) issued in PCT Application No. PCT/JP2022/015167 dated May 24, 2022 (5 pages).

* cited by examiner

SCREW COMPRESSOR HAVING WORKING CHAMBER CLOSING MEMBER TO REGULATE SUCTION WORKING MEDIUM FLOW TO A WORKING CHAMBER

TECHNICAL FIELD

The present invention is suited for application to various screw compressors such as an injection-type screw compressor for injecting a cooling medium such as oil or water during compression operation and a dry-type screw compressor which does not inject anything.

BACKGROUND ART

Conventionally, a screw compressor disclosed in PTL 1 has been known as an invention regarding a screw compressor. This screw compressor is configured so that a connector is provided to connect a rotor casing with a main body casing, an air inlet is located at a side part of the main body casing, and an intake port is an axial-direction intake port located at an end of the rotor casing in an axial direction of a screw rotor.

According to such a configuration, the connector is located in a suction space to connect the rotor casing with the main body casing. Therefore, it is possible to prevent heavy vibrations of the rotor casing during the operation of the screw compressor without significantly increasing manufacturing cost. Specifically speaking, performance degradation and damage can be prevented by reducing the vibrations of the screw compressor in operation and it is possible to eliminate the necessity to increase the thickness of the main body casing as a countermeasure against the vibrations.

As a result, if the above-described screw compressor is employed, the necessity to enhance rigidity of the main body casing by adding components can be eliminated. Therefore, it is possible to reduce the vibrations of the screw compressor in operation and prevent the performance degradation and the damage without significantly increasing the manufacturing cost.

CITATION LIST

Patent Literature

PTL 1: Japanese Patent Application Laid-Open (Kokai) Publication No. 2016-8509

SUMMARY OF THE INVENTION

Problems to be Solved by the Invention

Screw compressors are in widespread use as air compressors and compressors for refrigeration and air conditioning. Accordingly, there is a strong demand for energy saving regarding the screw compressors and it has become increasingly more important to have high energy efficiency and a large air volume (high capacity). In this case, regarding the injection-type screw compressor(s), when realizing downsizing to achieve low cost, it is inevitable to increase a speed for sucking the working medium into a working chamber.

On the other hand, a dry-type screw compressor(s) cannot expect a sealing effect by a cooling medium within the working chamber, so that the dry-type screw compressor(s) is driven at high-speed rotations in excess of 10,000 rotations per minute in order to reduce leakage loss of the working medium within the working chamber. Specifically speaking, from the viewpoint of achieving high energy efficiency, as the screw compressor is driven at higher speeds, the speed of the working medium flowing into the working chamber will be accelerated quickly. So, the problem is that acceleration loss of the working medium will increase unless the suction of the working medium into the working chamber can be performed smoothly.

The present invention was devised in consideration of the above-described circumstances and aims at proposing a screw compressor capable of reducing the acceleration loss of the working medium and compressing the working medium at high energy efficiency.

Means to Solve the Problems

In order to solve the above-described problems, there is provided according to the present invention a screw compressor for compressing a working medium sucked through a suction opening and discharging the compressed working medium through a delivery opening, wherein the screw compressor includes: a male rotor and a female rotor that rotate while meshing with each other; a casing that houses the male rotor and the female rotor and is provided with a bore which forms a working chamber designed, together with the male rotor and the female rotor, to compress the working medium; a drive unit that rotationally drives at least one of the male rotor and the female rotor; a working chamber closing unit that forms a suction port for sucking the working medium into the working chamber and closes the working chamber when the working chamber reaches a specified capacity; and a suction space that connects the suction opening and the suction port to allow communication therebetween, wherein an open space that connects the suction opening and the suction port to allow communication therebetween is provided between a shaft of the male rotor and a shaft of the female rotor on an opposite side of the male rotor and the female rotor relative to the suction port.

If the screw compressor according to the present invention is employed, the suction of the working medium into the working chamber can be performed smoothly with low flow resistance of the working medium sucked through the suction opening. Accordingly, when the male rotor and the female rotor rotate at a high speed, the speed will not be decelerated when the working medium flows into the working chamber. So, energy efficiency of the screw compressor can be enhanced by suppressing the energy for accelerating the working medium; and, on the other hand, also when the male rotor and the female rotor rotate at a low speed, a flow rate of the working medium can be increased along with a reduction of suction resistance of the working medium.

Advantageous Effects of the Invention

The screw compressor capable of reducing the acceleration loss of the working medium and compressing the working medium at high energy efficiency can be implemented according to the present invention.

DESCRIPTION OF EMBODIMENTS

One embodiment of the present invention will be described below in detail with reference to the drawings.

(1) First Embodiment

Figure 1:
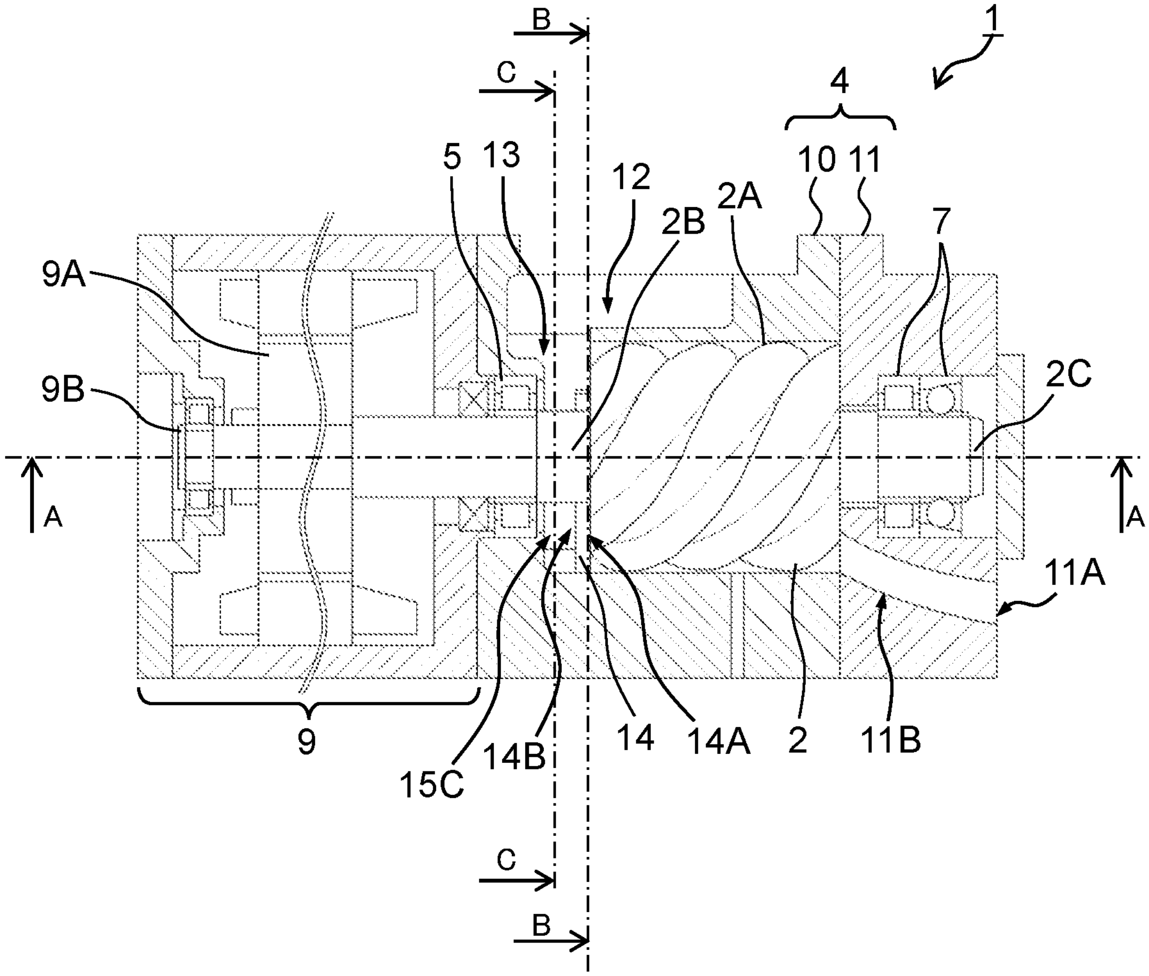
FIG. 1 is a sectional view illustrating the configuration of a screw compressor according to a first embodiment.
Figure 2:
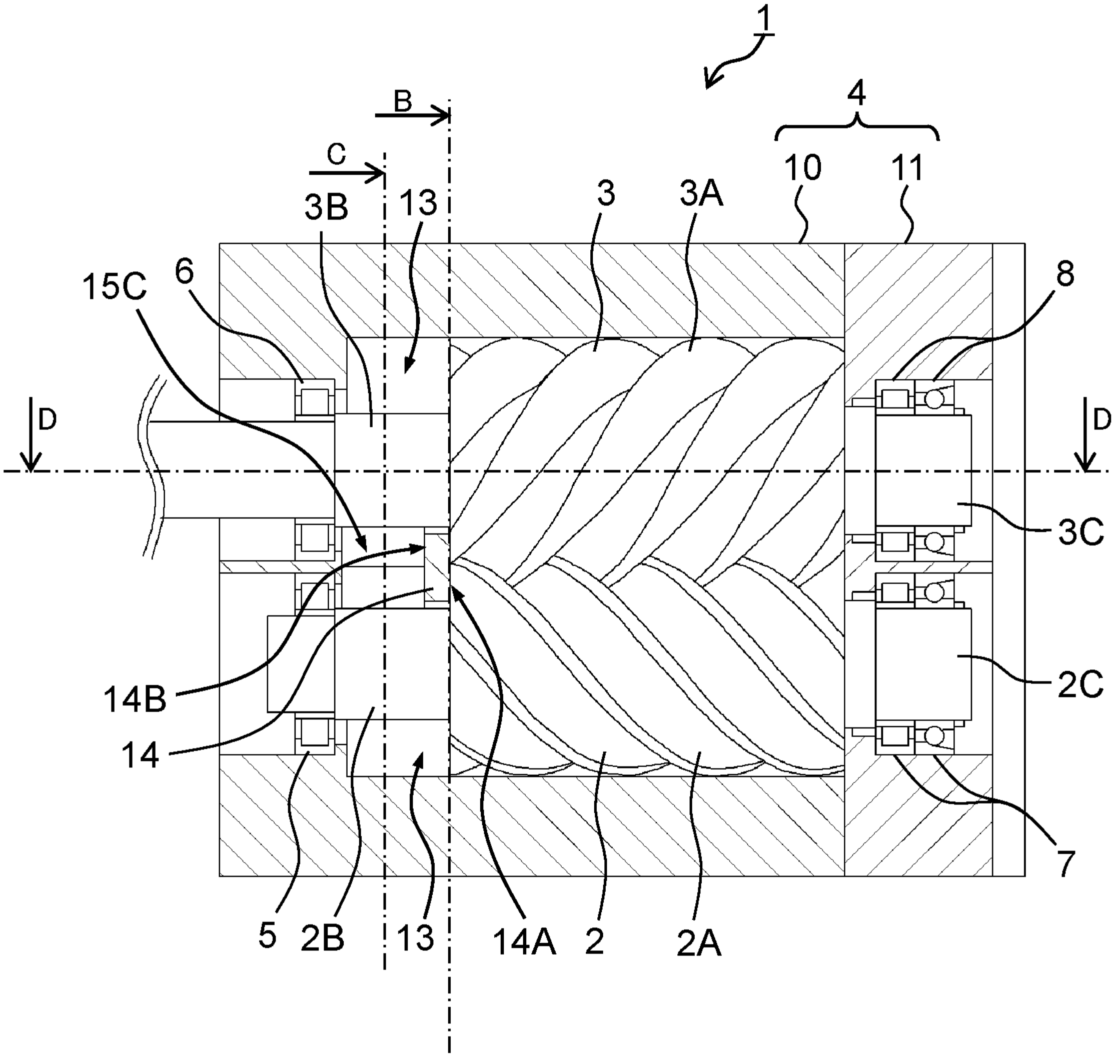
FIG. 2 is a sectional view illustrating the configuration of the screw compressor according to the first embodiment (a diagram taken along line A-A indicated with arrows in FIG. 1)
Figure 3:
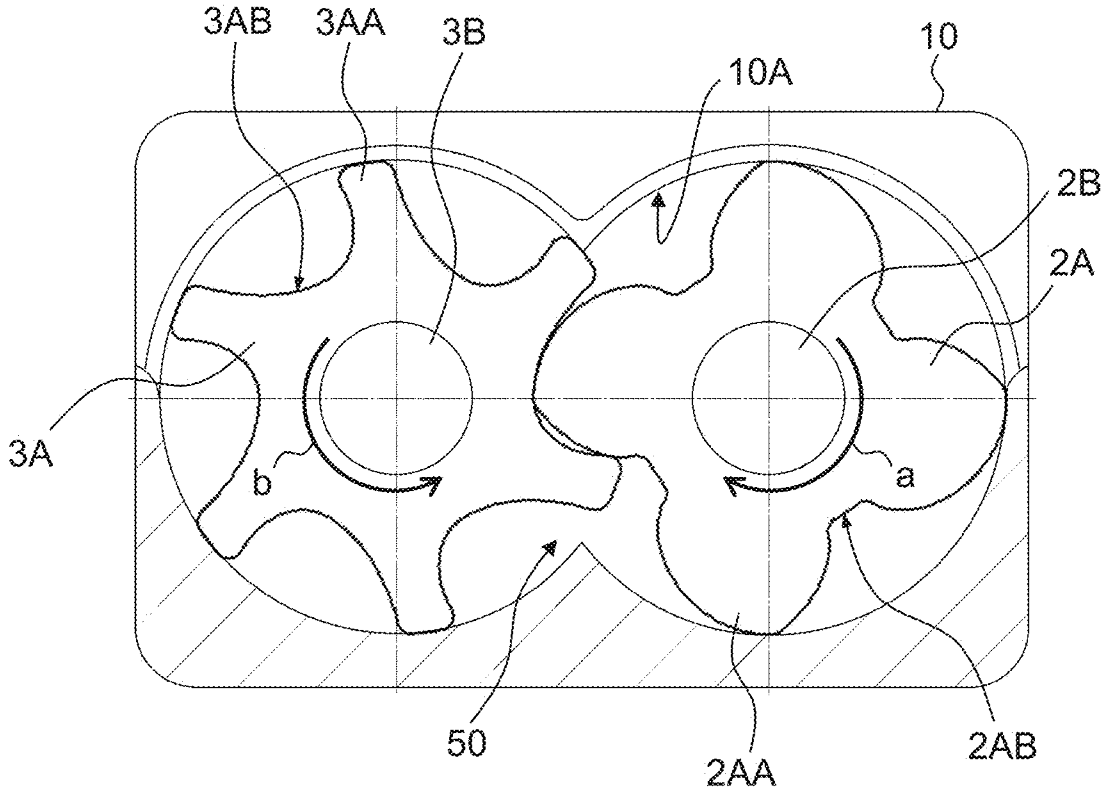
FIG. 3 is a sectional view illustrating the configuration of the screw compressor according to the first embodiment (a diagram taken along line B-B indicated with arrows in FIG. 1)
Figure 4:
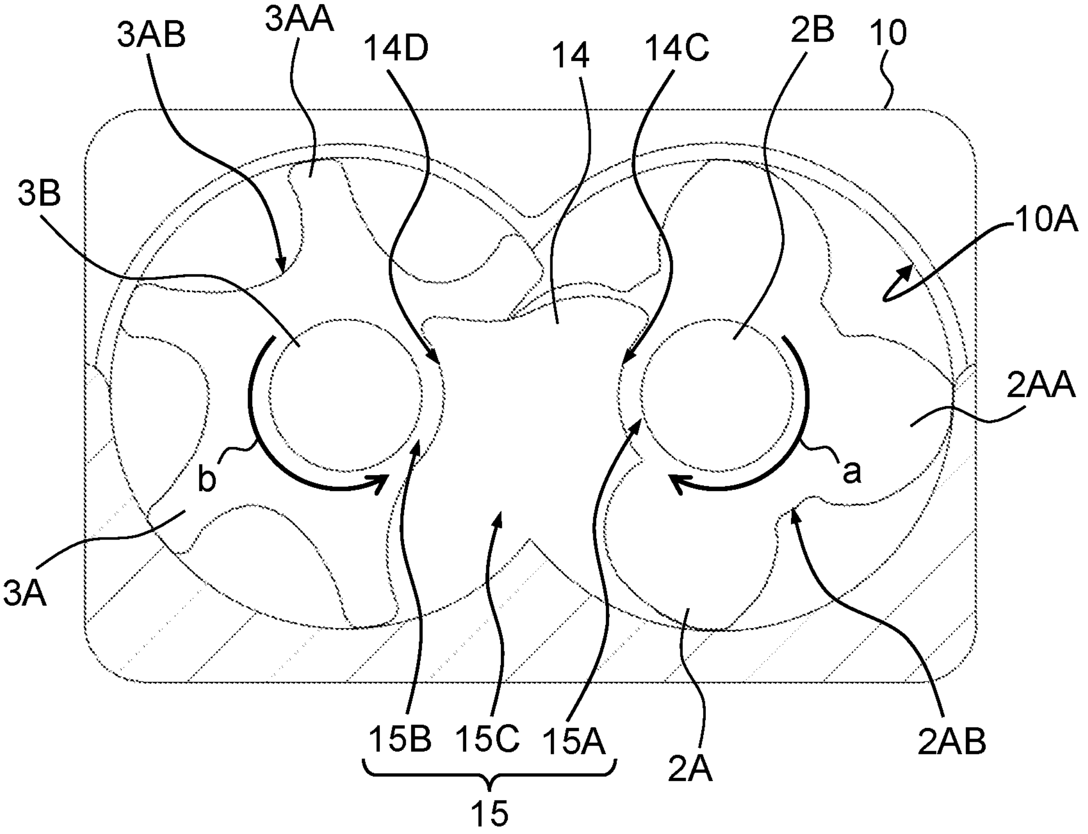
FIG. 4 is a sectional view illustrating the configuration of the screw compressor according to the first embodiment (a diagram taken along line C-C indicated with arrows in FIG. 1)

FIG. 1 to FIG. 4 illustrate a screw compressor according to a first embodiment. FIG. 1 is a diagram taken along line D-D indicated with arrows in FIG. 2; FIG. 2 is a diagram taken along line A-A indicated with arrows in FIG. 1; FIG. 3 is a diagram taken along line B-B indicated with arrows in FIG. 1 and FIG. 2; and FIG. 4 is a diagram taken along line C-C indicated with arrows in FIG. 1 and FIG. 2.

A screw compressor 1 according to this embodiment is configured, as illustrated in FIG. 1 and FIG. 2, by including a male rotor 2 and a female rotor 3 which are screw rotors, and a casing 4 for housing the male rotor 2 and the female rotor 3.

The male rotor 2 is configured by including: a lobe unit 2A provided with a plurality of (four in this embodiment) spirally extending lobes 2AA (FIG. 3 and FIG. 4); a suction-side shaft 2B connected to one end side of the lobe unit 2A in its rotor shaft direction (the left side in FIG. 1 and FIG. 2); and a delivery-side shaft 2C connected to the other end side of the lobe unit 2A in the rotor shaft direction (the right side in FIG. 1 and FIG. 2). The suction-side shaft 2B of the male rotor 2 is freely rotatably supported by a suction-side bearing 5 and the delivery-side shaft 2C of the male rotor 2 is freely rotatably supported by a delivery-side bearing 7.

Similarly, the female rotor 3 is configured by including: a lobe unit 3A provided with a plurality of (six in this embodiment) spirally extending lobes 3AA (FIG. 3 and FIG. 4); a suction-side shaft 3B connected to one end side of the lobe unit 3A in its rotor shaft direction; and a delivery-side shaft 3C connected to the other end side of the lobe unit 3A in the rotor shaft direction. The suction-side shaft 3B of the female rotor 3 is freely rotatably supported by a suction-side bearing 6 and the delivery-side shaft 3C of the female rotor 3 is freely rotatably supported by a delivery-side bearing 8.

The suction-side shaft 3B of the female rotor 3 pierces through the casing 4 and is coupled to a rotating shaft 9B of a motor 9A which configures a drive unit 9. Accordingly, the female rotor 3 can be rotationally driven integrally with the rotating shaft 9B of the motor 9A by driving the motor 9A. Furthermore, the male rotor 2 can be also rotationally driven integrally with the female rotor 3 by means of meshing between the lobe unit 3A of the female rotor 3 and the lobe unit 2A of the male rotor 2. However, either the male rotor 2 or the female rotor 3 may be driven when driving the screw compressor 1. Moreover, the male rotor 2 and the female rotor 3 may be synchronized with each other and both of them may be driven by the motor.

The casing 4 is composed of a main casing 10 and a D casing 11 coupled to the other end side of the main casing 10 in the rotor shaft direction (the right side in FIG. 1 and FIG. 2). The following are formed in the D casing 11: a delivery opening 11A positioned outside, in a rotor diameter direction, of the lobe unit 2A of the male rotor 2 and the lobe unit 3A of the female rotor 3 (the lower side in FIG. 1); and a delivery passage 11B formed to connect the delivery opening 11A and a working chamber described later.

Furthermore, a bore 10A for housing the lobe unit 2A of the male rotor 2 and the lobe unit 3A of the female rotor 3 is formed in the main casing 10 as illustrated in FIG. 3. The bore 10A is a space shaped as two cylindrical holes which partially overlap with each other and are designed to house the lobe unit 2A of the male rotor 2 and the lobe unit 3A of the female rotor 3 in a state where the lobe unit 2A and the lobe unit 3A mesh with each other.

An inner wall surface of the bore 10A, a groove 2AB (FIG. 3 and FIG. 4) for the male rotor 2, and a groove 3AB (FIG. 3 and FIG. 4) for the female rotor 3 form the working chamber. The working chamber is formed so that its volume gradually decreases from its one side in the rotor shaft direction (the left side in FIG. 1 and FIG. 2) to the other side (the right side in FIG. 1 and FIG. 2). Accordingly, a working medium such as air sucked through the suction opening 12 is gradually compressed in the working chamber and is then delivered from the delivery opening 11A through the delivery passage 11B.

The suction opening 12 is formed outside, in the rotor diameter direction, of the lobe unit 2A of the male rotor 2 and the lobe unit 3A of the female rotor 3 in the main casing 10 (the upper side in FIG. 1). The suction opening 12 is connected to a suction port 50 (FIG. 3) via the suction space 13 to allow communication therebetween as illustrated in FIG. 1 and FIG. 2 and the working medium sucked through the suction opening 12 sequentially passes through the suction space 13 and the suction port 50 and is then sucked into the working chamber. Incidentally, the suction port 50 is a port provided on a plane surface which includes an end face of the one end side of the lobe unit 2A of the male rotor 2 in the rotor shaft direction and an end face of the one end side of the lobe unit 3A of the female rotor 3 in the rotor shaft direction inside the bore 10A and which is perpendicular to an axial direction of the male rotor 2 and the female rotor 3.

A working chamber closing member 14 of a plate shape is located at the suction port 50 so as to close the end face of the one end side of the lobe unit 2A of the male rotor 2 and the end face of the one end side of the lobe unit 3A of the female rotor 3 (to close the working chamber) when the working chamber reaches the maximum capacity. Practically, the working chamber closing member 14 is located between the suction-side shaft 2B of the male rotor 2 and the suction-side shaft 3B of the female rotor 3 so that one surface (hereinafter referred to as a "rotor-facing surface") 14A side opposite the end face on the one end side of the lobe unit 2A of the male rotor 2 in the rotor shaft direction and the end face on the one end side of the lobe unit 3A of the female rotor 3 in the rotor shaft direction will be located on the suction port 50.

Furthermore, an arc-shaped depression 14C which is coaxial with the suction-side shaft 2B (i.e., which is centered at the center of the rotor shaft of the male rotor 2) and has a diameter (radius) larger than that of the suction-side shaft 2B to a certain degree is formed on the opposite side of the male rotor 2 and the female rotor 3 relative to the suction port 50 and at a position opposite the suction-side shaft 2B of the male rotor 2 in the working chamber closing member 14. Accordingly, a space of a certain size (hereinafter referred to as a "male-rotor-side open space") 15A is formed between the suction-side shaft 2B of the male rotor 2 and the depression 14C of the working chamber closing member 14.

Similarly, an arc-shaped depression 14D which is coaxial with the suction-side shaft 3B (i.e., which is centered at the center of the rotor shaft of the female rotor 3) and has a diameter larger than of the suction-side shaft 3B to a certain degree is formed at a position opposite the suction-side shaft 3B of the female rotor 3 in the working chamber closing member 14. Accordingly, a space of a certain size (hereinafter referred to as a "female-rotor-side open space") 15B is formed between the suction-side shaft 3B of the female rotor 3 and the depression 14D of the working chamber closing member 14.

In this case, the diameter of the depression 14C or 14D in the working chamber closing member 14 is selected to be smaller than a root diameter of the male rotor 2 or the female rotor 3 and to be larger than a radius of the suction-side shaft 2B of the male rotor 2 or the suction-side shaft 3B of the female rotor 3 so that the working chamber can be closed.

Furthermore, an open space which is positioned between the suction-side shaft 2B of the male rotor 2 and the suction-side shaft 3B of the female rotor 3 and is connected to the suction space 13 and both the male-rotor-side open space 15A and the female-rotor-side open space 15B, respectively, to allow communication therebetween (hereinafter referred to as a "motor-side open space") 15C is provided on the other surface of the working chamber closing member 14 on the opposite side of the rotor-facing surface 14A (hereinafter referred to as an "opposite rotor-facing surface") 14B.

Incidentally, this motor-side open space 15C and the male-rotor-side open space 15A and the female-rotor-side open space 15B will be hereinafter collectively referred to as an open space 15. This open space 15 is a section that connects the suction space 13 which exists outside the suction-side shaft 2B of the male rotor 2, and the suction space 13 which exists outside the suction-side shaft 3B of the female rotor 3, to the suction port 50 to allow communication therebetween.

Figure 5:
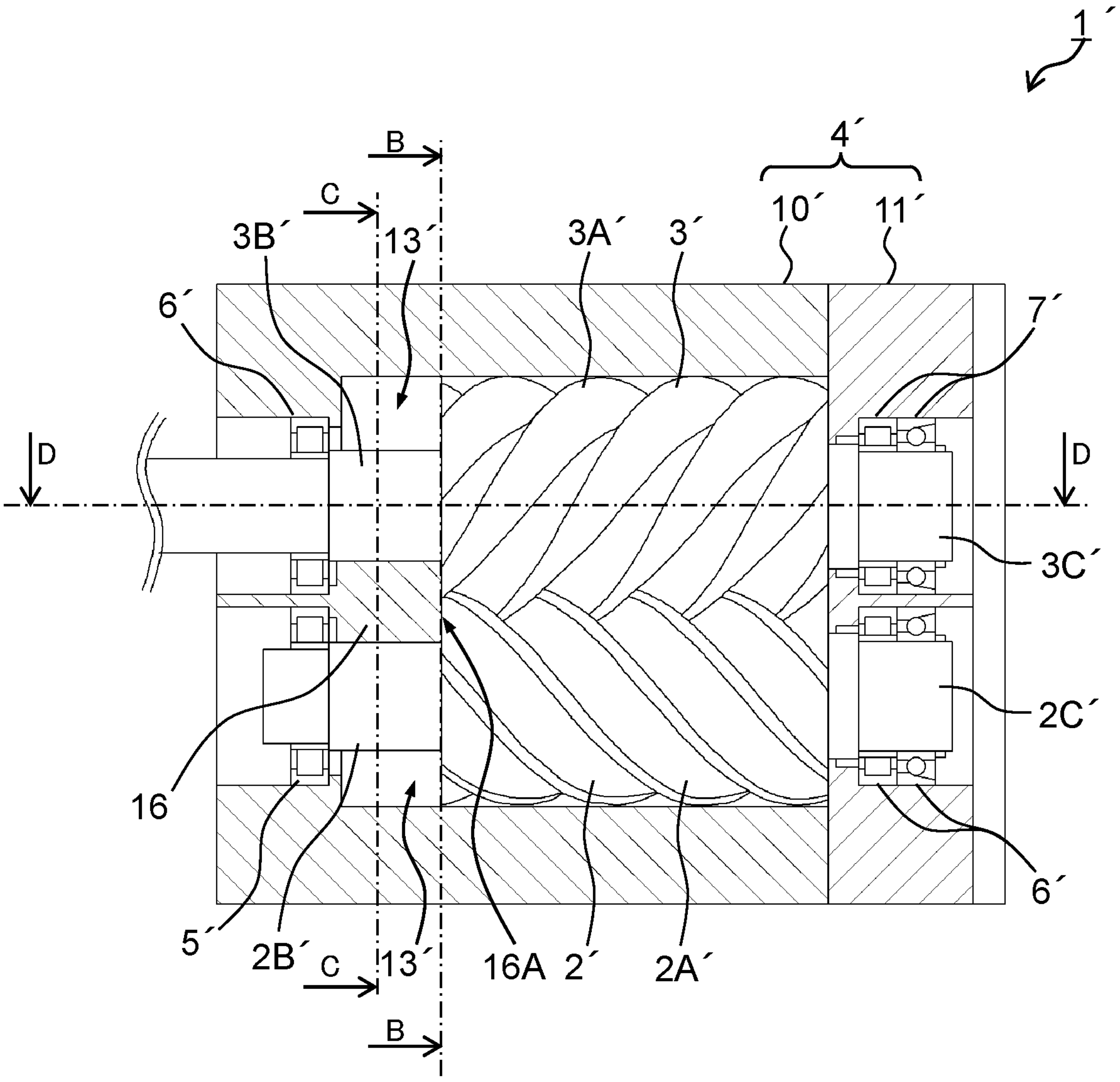
FIG. 5 is a sectional view illustrating a configuration example of a conventional screw compressor.
Figure 6:
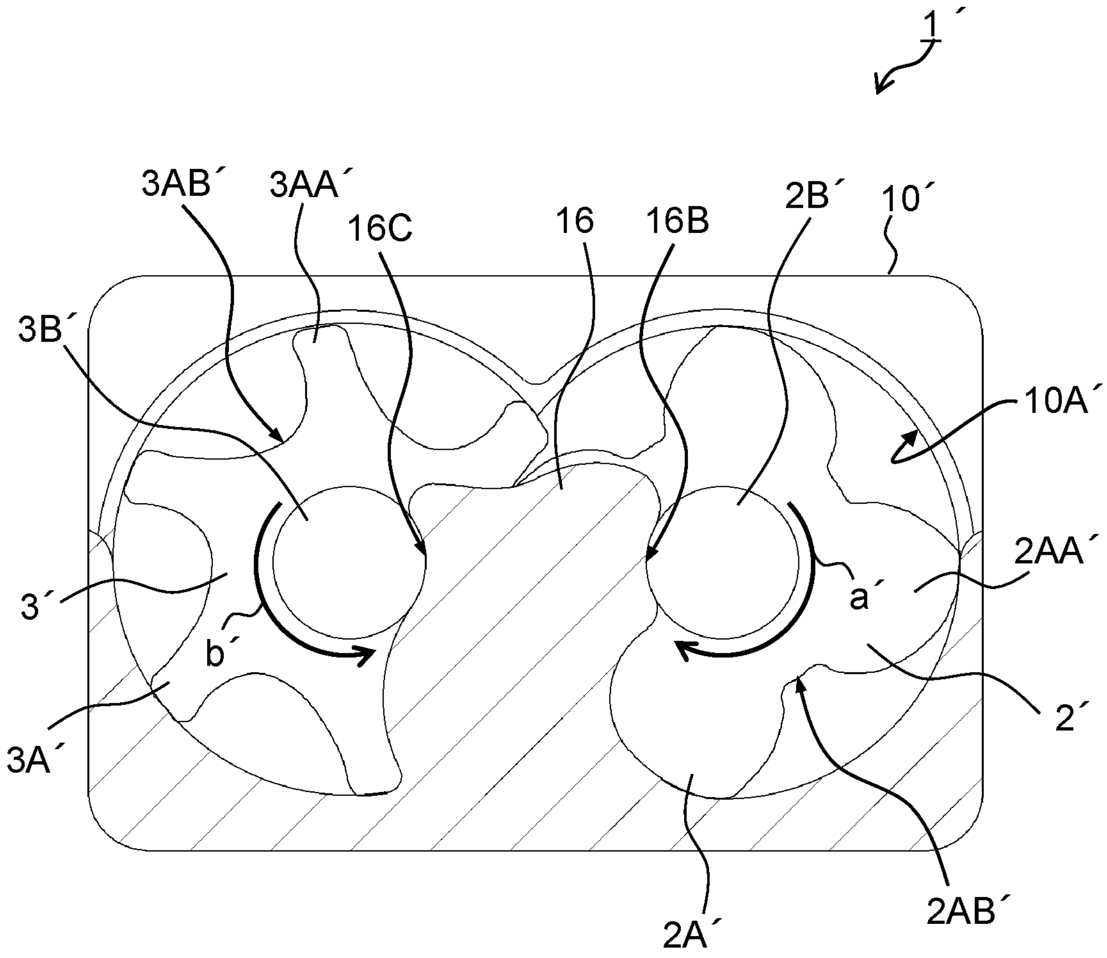
FIG. 6 is a sectional view illustrating the configuration of the conventional screw compressor corresponding to FIG. 5.

Now, each of FIG. 5 and FIG. 6 in which the same reference numerals as those used in FIG. 2 and FIG. 4 are assigned with a prime symbol ("'") attached thereto to parts corresponding to those in FIG. 2 and FIG. 4 illustrates the structure of the parts corresponding to FIG. 2 and FIG. 4 in a corresponding screw compressor 1'. As is apparent from FIG. 5 and FIG. 6, the conventional screw compressor 1' is designed so that: a space similar to the open space 15C according to this embodiment is not provided on the opposite side of a rotor-facing surface 16A of a working chamber closing unit 16 corresponding to the working chamber closing member 14 according to this embodiment; and the working chamber closing unit 16 is formed integrally with a main casing 10' to fill up the part corresponding to this open space 15C.

Moreover, with the conventional screw compressor 1', the arc-shaped depression 16B which is coaxial with a suction-side shaft 2B' is formed at a position opposite the suction-side shaft 2B' of a male rotor 2' in the working chamber closing unit 16, but the diameter of this depression 16B is selected to a degree of not impeding rotations of the suction-side shaft 2B' of the male rotor 2. Accordingly, only a minute clearance is formed between the working chamber closing unit 16 and the suction-side shaft 2B' of the male rotor 2" and no space like the male-rotor-side open space 15A (FIG. 4) of the screw compressor 1 according to this embodiment exists.

Similarly, with the conventional screw compressor 1", the arc-shaped depression 16C which is coaxial with a suction-side shaft 3B" is formed at a position opposite the suction-side shaft 3B of the female rotor 3 in the working chamber closing unit 16, but the diameter of this depression 16C is selected to a degree of not impeding rotations of the suction-side shaft 3B" of a female rotor 3". Accordingly, only a minute clearance is formed between the working chamber closing unit 16 and the suction-side shaft 3B" of the female rotor 3" and no space like the female-rotor-side open space 15B (FIG. 4) of the screw compressor 1 according to this embodiment exists.

Regarding the conventional screw compressor 1" having the above-described configuration, the working medium sucked through the suction opening passes through respectively a suction space 13" which exists outside the suction-side shaft 2B" of the male rotor 2", and a suction space 13" which exists outside the suction-side shaft 3B" of the female rotor 3", and then flows into the screw compressor 1"; and since a flow of the working medium which flows through these suction spaces 13" is dammed up by the working chamber closing unit 16, flow resistance within the suction spaces 13" increases, thereby impeding the suction of the working chamber into the working chamber.

On the other hand, regarding the screw compressor 1 according to this embodiment, the working medium sucked through the suction opening 12 passes through respectively a space part of the suction space 13 which exists outside the suction-side shaft 2B of the male rotor 2, and a space part of the suction space 13 which exists outside the suction-side shaft 3B of the female rotor 3, and then flows into the screw compressor 1 in a manner similar to that of the conventional screw compressor 1". In this case, the working medium which flows through these respective space parts of the suction space 13 flows into the open space 15 which is composed of the male-rotor-side open space 15A, the female-rotor-side open space 15B, and the motor-side open space 15C, so that the flow of the working medium which passes through the space part of the suction space existing outside the suction-side shaft 2B of the male rotor 2 and the space part of the suction space 13 existing outside the suction-side shaft 3B of the female rotor 3 and then flows into the screw compressor 1 is not dammed up by the working chamber closing member 14.

Then, part of the working medium which has flown through the space part of the suction space 13 existing outside the suction-side shaft 2B of the male rotor 2 collides against a side wall on the male rotor 2 side of the working chamber closing member 14, then passes through the male-rotor-side open space 15A between the depression 14C of the working chamber closing member 14 and the suction-side shaft 2B of the male rotor 2, then flows within the suction space 13 and the open space 15 as if rotating around the suction-side shaft 2B of the male rotor 2 in the same direction as a rotation direction of the suction-side shaft 2B (the rotation direction indicated with arrow a in FIG. 4), and is eventually sucked into the working chamber through the suction port.

Furthermore, the remaining working medium collides against the working medium, which has flown through the space part of the suction space 13 existing outside the suction-side shaft 3B of the female rotor 3, in the motor-side open space 15C, then flows within the suction space 13 and the open space 15 as if rotating around the suction-side shaft 2B of the male rotor 2 in the same direction as the rotation direction of the suction-side shaft 2B, and is eventually sucked into the working chamber through the suction port 50.

Similarly, part of the working medium which has flown through the space part of the suction space 13 existing outside the suction-side shaft 3B of the female rotor 3 collides against a side wall on the female rotor 3 side of the working chamber closing member 14, then passes through the female-rotor-side open space 15B between the depression 14D of the working chamber closing member 14 and the suction-side shaft 3B of the female rotor 3, then flows within the suction space 13 and the open space 15 as if rotating around the suction-side shaft 3B of the female rotor 3 in the same direction as a rotation direction of the suction-side shaft 3B (the rotation direction indicated with arrow b in FIG. 4), and is eventually sucked into the working chamber through the suction port 50.

Furthermore, the remaining working medium collides against the working medium, which has flown through the space part of the suction space 13 existing outside the suction-side shaft 2B of the male rotor 2, in the motor-side open space 15C, then flows within the suction space 13 and the open space 15 as if rotating around the suction-side shaft 3B of the female rotor 3 in the same direction as the rotation direction of the suction-side shaft 3B, and is eventually sucked into the working chamber through the suction port 50.

Therefore, the screw compressor 1 according to this embodiment is provided with the open space 15 which is composed of the male-rotor-side open space 15A, the female-rotor-side open space 15B, and the motor-side open space 15C, it has lower flow resistance of the working medium sucked through the suction opening 12 than that of the conventional screw compressor 1" and the suction of the working medium into the working chamber is performed smoothly.

Accordingly, when the male rotor 2 and the female rotor 3 rotate at a high speed, the speed is not decelerated when the working medium flows into the working chamber; and, therefore, energy efficiency of the screw compressor can be enhanced by suppressing the energy for accelerating the working medium. On the other hand, when the male rotor 2 and the female rotor 3 rotate at a low speed, a flow rate of the working medium can be increased along with a reduction of suction resistance of the working medium. Therefore, if this screw compressor 1 is employed, acceleration loss of the working medium can be reduced and the working medium can be compressed at high energy efficiency.

(2) Second Embodiment

Figure 7:
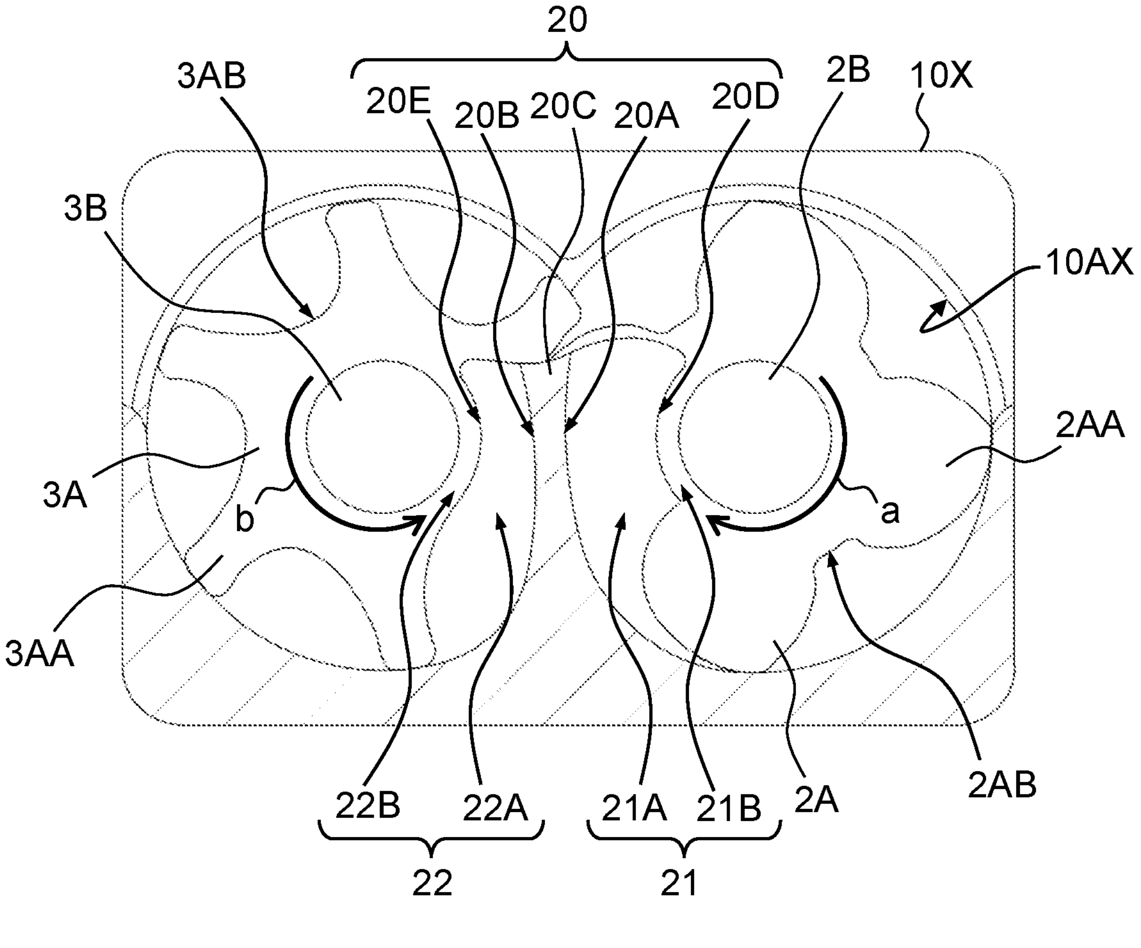
FIG. 7 is a sectional view corresponding to the diagram taken along line C-C indicated with arrows in FIG. 1 and illustrating the configuration of a screw compressor according to a second embodiment.

FIG. 7 in which the same reference numerals as those used in FIG. 4 or such same reference numerals with suffix "X" added thereto are assigned to parts corresponding to those in FIG. 4 illustrates a partial configuration of a screw compressor according to a second embodiment and corresponds to a diagram taken along line C-C indicated with arrows in FIG. 1. The screw compressor according to this embodiment is configured in a manner similar to the screw compressor 1 according to the first embodiment, except that, instead of the working chamber closing member 14 (FIG. 1, FIG. 2, FIG. 4) according to the first embodiment, a working chamber closing unit 20 of the same size as that of the working chamber closing unit 16 is formed integrally with a main casing 10X at the same position as the conventional working chamber closing unit 16 described earlier with reference to FIG. 6.

In this case, the working chamber closing unit 20 of the screw compressor according to this embodiment has a male-rotor-side recess 20A and a female-rotor-side recess 20B which are formed by grinding a side part opposite the male rotor 2 and a side part opposite the female rotor 3 so that it extends from one end of the motor 9A (FIG. 1) side of the rotor shaft direction and reaches the vicinity of a rotor-facing surface (a surface opposite an end of the lobe unit 2A of the male rotor 2 and the lobe unit 3A of the female rotor 3). Moreover, the male-rotor-side recess 20A and the female-rotor-side recess 20B are respectively formed in a curved shape which is smoothly joined to an inner wall surface of a bore 10AX as viewed from the rotor shaft direction of the male rotor 2 and the female rotor 3.

Then, by forming the male-rotor-side recess 20A and the female-rotor-side recess 20B in the working chamber closing unit 20 as described above, a first male-rotor-side open space 21A of the same shape as that of the male-rotor-side recess 20A is formed between an isolation wall 20C of the working chamber closing unit 20, which isolates the male-rotor-side recess 20A from the female-rotor-side recess 20B, and the suction-side shaft 2B of the male rotor 2 and a first female-rotor-side open space 22A of the same shape as that of the female-rotor-side recess 20B is formed between the isolation wall 20 and the suction-side shaft 3B of the female rotor 3.

Furthermore, an arc-shaped depression 20D which is coaxial with the suction-side shaft 2B of the male rotor 2 and has a diameter larger than that of the suction-side shaft 2B to a certain degree is formed in the working chamber closing unit 20 at a position opposite the suction-side shaft 2B of the male rotor 2 on the rotor-facing surface side. Accordingly, a second male-rotor-side open space 21B of a certain size which is connected to the first male-rotor-side open space 21A to allow communication therewith and configures, together with the first male-rotor-side open space 21A, a first open space 21 is formed between the suction-side shaft 2B of the male rotor 2 and the working chamber closing unit 20.

Similarly, an arc-shaped depression 20E which is coaxial with the suction-side shaft 3B of the female rotor 3 and has a diameter larger than that of the suction-side shaft 3B to a certain degree is formed in the working chamber closing unit 20 at a position opposite the suction-side shaft 3B of the female rotor 3 on the rotor-facing surface side. Accordingly, a second female-rotor-side open space 22B of a certain size which is connected to the second female-rotor-side open space 22A to allow communication therewith and configures, together with the first female-rotor-side open space 22A, a second open space 22 is formed between the suction-side shaft 3B of the female rotor 3 and the working chamber closing unit 20.

In this case, the diameter of the depression 20D or 20E of the working chamber closing unit 20 is selected to be smaller than a root diameter of the male rotor 2 or the female rotor 3 and to be larger than the radius of the suction-side shaft 2B of the male rotor 2 or the suction-side shaft 3B of the female rotor 3 so that the working chamber can be closed.

With the screw compressor according to this embodiment having the above-described configuration, the working medium which has flown through the space part of the suction space 13 (FIG. 1 and FIG. 2) existing outside the suction-side shaft 2B of the male rotor 2 flows within the suction space 13 and the first open space 21 as if rotating around the suction-side shaft 2B of the male rotor 2 in the same direction as a rotation direction of the suction-side shaft 2B (the rotation direction indicated with arrow a as shown in FIG. 3) along a wall surface of the male-rotor-side recess 20A of the working chamber closing unit 20 and is eventually sucked into the working chamber through the suction port 50.

Furthermore, part of the working medium which has flown through the space part of the suction space 13 existing outside the suction-side shaft 2B of the male rotor 2 collides against a side wall on the rotor-facing surface side of the working chamber closing member 14, then passes through the second male-rotor-side open space 21B of the working chamber closing member 20, then flows within the suction space 13 and the first open space 21 as if rotating around the suction-side shaft 2B of the male rotor 2 in the same direction as the rotation direction of the suction-side shaft 2B, and is eventually sucked into the working chamber through the suction port 50.

Similarly, with this screw compressor, the working medium which has flown through the space part of the suction space 13 (FIG. 1 and FIG. 2) existing outside the suction-side shaft 3B of the female rotor 3 flows within the suction space 13 and the second open space 22 as if rotating around the suction-side shaft 3B of the female rotor 3 in the same direction as a rotation direction of the suction-side shaft 3B (the rotation direction indicated with arrow b) along a wall surface of the female-rotor-side recess 20B of the working chamber closing unit 20 and is eventually sucked into the working chamber through the suction port 50.

Furthermore, part of the working medium which has flown through the space part of the suction space 13 existing outside the suction-side shaft 3B of the female rotor 3 collides against a side wall on the rotor-facing surface side of the working chamber closing member 20, then passes through the second female-rotor-side open space 22B of the working chamber closing member 20, then flows within the suction space 13 and the second open space 22 as if rotating around the suction-side shaft 3B of the female rotor 3 in the same direction as the rotation direction of the suction-side shaft 3B, and is eventually sucked into the working chamber through the suction port 50.

The screw compressor according to this embodiment is configured as described above so that the first open space 21 and the second open space 22 are separated from each other; and, therefore, it exhibits the effect of rectifying the working medium which flows within, for example, the suction space 13 along with the rotations of the male rotor 2 and the female rotor 3. Particularly, when the male rotor 2 and the female rotor 3 rotate at a high speed, this rectification effect is valid; and in a case of the screw compressor with a low low-speed operation ratio, it has a high suction resistance effect. Moreover, regarding this screw compressor, the male-rotor-side recess 20A and the female-rotor-side recess 20B of the working chamber closing unit 20 are respectively formed in a curved shape which is smoothly joined to the inner wall surface of the bore 10AX, so that it exhibits the effect of further impeding disturbances of the flow of the working medium which flows within, for example, the suction space 13.

Therefore, if the screw compressor according to this embodiment is employed, the working medium sucked through the suction opening 12 (FIG. 1) has lower flow resistance than that of the conventional screw compressor and the suction of the working medium into the working chamber is performed smoothly. Accordingly, when the male rotor 2 and the female rotor 3 rotate at a high speed, the speed is not decelerated when the working medium flows into the working chamber; and, therefore, energy efficiency of the screw compressor can be enhanced by suppressing the energy for accelerating the working medium. Also, when the male rotor 2 and the female rotor 3 rotate at a low speed, the flow rate of the working medium can be increased along with a reduction of the suction resistance of the working medium.

(3) Third Embodiment

Figure 8:
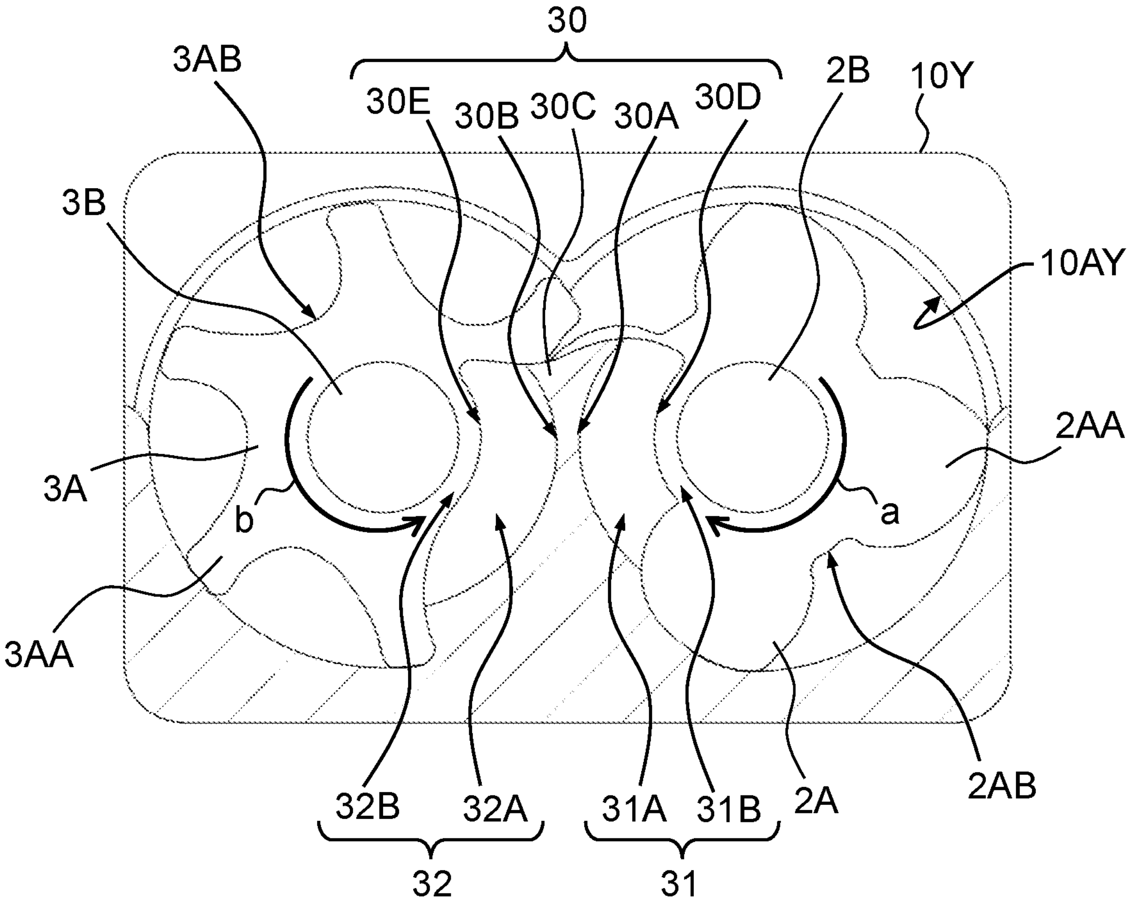
FIG. 8 is a sectional view corresponding to the diagram taken along line C-C indicated with arrows in FIG. 1 and illustrating the configuration of a screw compressor according to a third embodiment.

FIG. 8 in which the same reference numerals as those used in FIG. 4 or such same reference numerals with suffix "Y" added thereto are assigned to parts corresponding to those in FIG. 4 illustrates a partial configuration of a screw compressor according to a third embodiment and corresponds to a diagram taken along line C-C indicated with arrows in FIG. 1. The screw compressor according to this embodiment is configured in a manner similar to the screw compressor 1 according to the second embodiment, except that the configuration of a working chamber closing unit 30 is different.

Practically, with the screw compressor according to this embodiment, the working chamber closing unit 30 of the same size as that of the working chamber closing unit 16 is formed integrally with a main casing 10Y at the same position as that of the conventional working chamber closing unit 16 described earlier with reference to FIG. 6.

This working chamber closing unit 30 has a male-rotor-side recess 30A and a female-rotor-side recess 30B which are formed on a side part opposite the male rotor 2 and a side part opposite the female rotor 3, respectively, so that they extend from an end of the motor 9A (FIG. 1) side in the rotor shaft direction and reach the vicinity of a rotor-facing surface (a surface opposite an end of the lobe unit 2A of the male rotor 2 and the lobe unit 3A of the female rotor 3).

Then, by forming the male-rotor-side recess 30A and the female-rotor-side recess 30B in the working chamber closing unit 30 as described above, a first male-rotor-side open space 31A of the same shape as that of the male-rotor-side recess 30A is formed between an isolation wall 30C of the working chamber closing unit 30, which isolates the male-rotor-side recess 30A from the female-rotor-side recess 30B, and the suction-side shaft 2B of the male rotor 2 and a first female-rotor-side open space 32A of the same shape as that of the female-rotor-side recess 30B is formed between the isolation wall 30 and the suction-side shaft 3B of the female rotor 3.

In this case, the male-rotor-side recess 30A is designed with its side face formed in an arc shape so that its curvature increases from an inlet side of the first male-rotor-side open space 31A for the working medium, which flows into the first male-rotor-side open space 31A as described later, towards its outlet side; and, therefore, a curvature of the first male-rotor-side open space 31A increases towards the rotation direction of the suction-side shaft 2B of the male rotor 2.

Similarly, the female-rotor-side recess 30B is designed with its side face formed in an arc shape so that its curvature increases from an inlet side of the first female-rotor-side open space 32A for the working medium, which flows into the first female-rotor-side open space 32A as described later, towards its outlet side; and, therefore, a curvature of the first female-rotor-side open space 32A increases towards the rotation direction of the suction-side shaft 3B of the female rotor 3.

Furthermore, an arc-shaped depression 30D which is coaxial with the suction-side shaft 2B of the male rotor 2 and has a diameter larger than that of the suction-side shaft 2B to a certain degree is formed in the working chamber closing unit 30 at a position opposite the suction-side shaft 2B of the male rotor 2 on the rotor-facing surface side. Accordingly, a second male-rotor-side open space 31B of a certain size which is connected to the first male-rotor-side open space 31A to allow communication therewith and configures, together with the first male-rotor-side open space 31A, a first open space 31 is formed between the suction-side shaft 2B of the male rotor 2 and the working chamber closing unit 30.

Similarly, an arc-shaped depression 30E which is coaxial with the suction-side shaft 3B of the female rotor 3 and has a diameter larger than that of the suction-side shaft 3B to a certain degree is formed in the working chamber closing unit 30 at a position opposite the suction-side shaft 3B of the female rotor 3 on the rotor-facing surface side. Accordingly, a second female-rotor-side open space 32B of a certain size which is connected to the second female-rotor-side open space 32A to allow communication therewith and configures, together with the first female-rotor-side open space 32A, a second open space 32 is formed between the suction-side shaft 3B of the female rotor 3 and the working chamber closing unit 30.

Incidentally, the diameter of the depression 30D or 30E of the working chamber closing unit 30 is selected to be smaller than a root diameter of the male rotor 2 or the female rotor 3 and to be larger than the radius of the suction-side shaft 2B of the male rotor 2 or the suction-side shaft 3B of the female rotor 3 so that the working chamber can be closed.

With the screw compressor according to this embodiment having the above-described configuration, the working medium which has flown through the space part of the suction space 13 (FIG. 1 and FIG. 2) existing outside the suction-side shaft 2B of the male rotor 2 flows within the suction space 13 and the first open space 21 as if rotating around the suction-side shaft 2B of the male rotor 2 in the same direction as the rotation direction of the suction-side shaft 2B (the rotation direction indicated with arrow a) along a wall surface of the male-rotor-side recess 30A of the working chamber closing unit 30 and is eventually sucked into the working chamber through the suction port 50.

Furthermore, part of the working medium which has flown through the space part of the suction space 13 existing outside the suction-side shaft 2B of the male rotor 2 collides against a side wall on the rotor-facing surface side of the working chamber closing member 30, then passes through the second male-rotor-side open space 31B of the working chamber closing member 30, then flows within the suction space 13 and the first male-rotor-side open space 31A as if rotating around the suction-side shaft 2B of the male rotor 2 in the same direction as the rotation direction of the suction-side shaft 2B, and is eventually sucked into the working chamber through the suction port 50.

Similarly, with this screw compressor, the working medium which has flown through the space part of the suction space 13 (FIG. 1 and FIG. 2) existing outside the suction-side shaft 3B of the female rotor 3 flows within the suction space 13 and the second open space 32 as if rotating around the suction-side shaft 3B of the female rotor 3 in the same direction as the rotation direction of the suction-side shaft 3B (the rotation direction indicated with arrow b) along a wall surface of the female-rotor-side recess 30B of the working chamber closing unit 30 and is eventually sucked into the working chamber through the suction port 50.

Furthermore, part of the working medium which has flown through the space part of the suction space 13 existing outside the suction-side shaft 3B of the female rotor 3 collides against a side wall on the rotor-facing surface side of the working chamber closing member 30, then passes through the second female-rotor-side open space 32B of the working chamber closing member 30, then flows within the suction space 13 and the second open space 32 as if rotating around the suction-side shaft 3B of the female rotor 3 in the same direction as the rotation direction of the suction-side shaft 3B, and is eventually sucked into the working chamber through the suction port 50.

The screw compressor according to this embodiment is configured as described above so that the first open space 31 and the second open space 32 are separated from each other; and, therefore, it exhibits the effect of rectifying the working medium which flows within, for example, the suction space 13 along with the rotations of the male rotor 2 and the female rotor 3 in a manner similar to that of the screw compressor according to the second embodiment.

Consequently, if the screw compressor according to this embodiment is employed, the working medium sucked through the suction opening 12 (FIG. 1) has lower flow resistance than that of the conventional screw compressor and the suction of the working medium into the working chamber is performed smoothly in a manner similar to that of the screw compressor according to the second embodiment. Accordingly, when the male rotor 2 and the female rotor 3 rotate at a high speed, the speed is not decelerated when the working medium flows into the working chamber; and, therefore, energy efficiency of the screw compressor can be enhanced by suppressing the energy for accelerating the working medium. Also, when the male rotor 2 and the female rotor 3 rotate at a low speed, the flow rate of the working medium can be increased along with a reduction of the suction resistance of the working medium.

In addition, with this screw compressor, the first male-rotor-side open space 31A or the first female-rotor-side open space 32A is formed in an arc shape with a larger curvature on its outlet side than that on its inlet side, a flow passage area of the working medium which flows within the first male-rotor-side open space 31A or the first female-rotor-side open space 31B is narrowed on the outlet side. Accordingly, the speed of the working medium which flows out of the outlet side of the first male-rotor-side open space 31A or the first female-rotor-side open space 31B can be increased and the acceleration loss of the working medium can be reduced.

Furthermore, with this screw compressor, a side-face shape of the male-rotor-side recess 30A and a side-face shape of the female-rotor-side recess 30B are formed in a substantially cylindrical shape, so that processing of the working chamber closing unit 30 is facilitated, thereby making it possible to improve manufacturing efficiency of the screw compressor and reduce manufacturing cost.

(4) Fourth Embodiment

Figure 9:
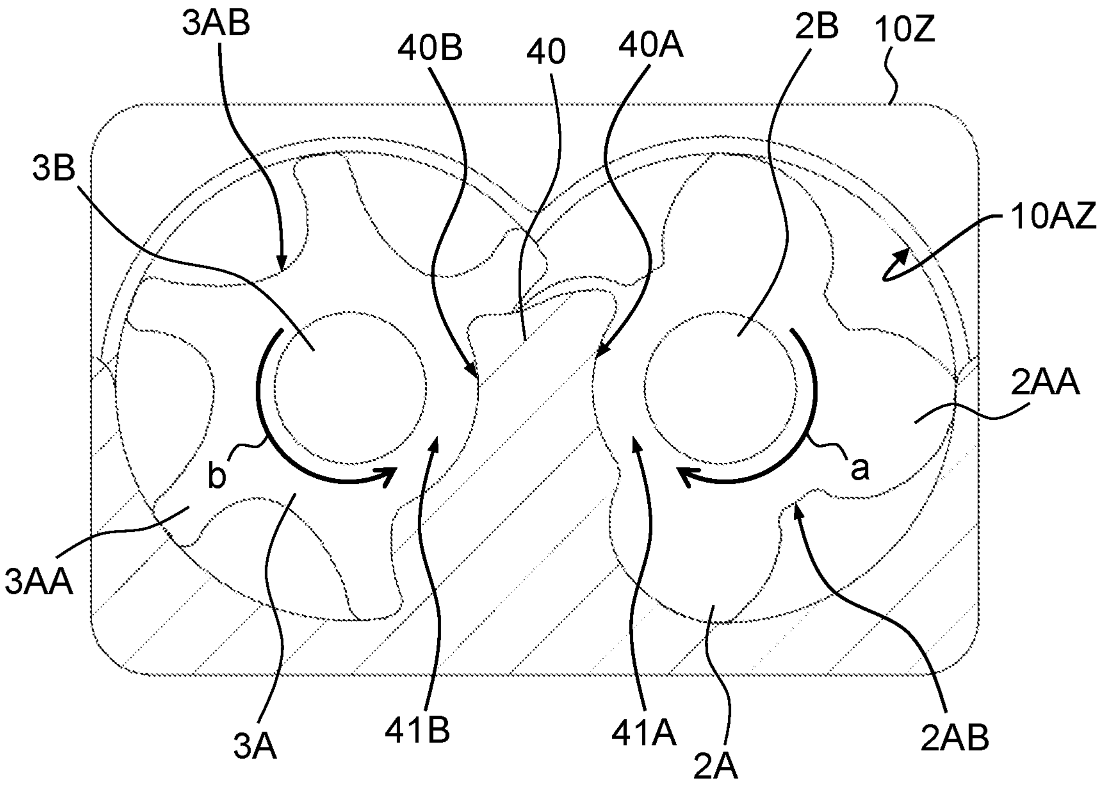
FIG. 9 is a sectional view corresponding to the diagram taken along line C-C indicated with arrows in FIG. 1 and illustrating the configuration of a screw compressor according to a fourth embodiment.

FIG. 9 in which the same reference numerals as those used in FIG. 4 or such same reference numerals with suffix "Z" added thereto are assigned to parts corresponding to those in FIG. 4 illustrates a partial configuration of a screw compressor according to a fourth embodiment and corresponds to a diagram taken along line C-C indicated with arrows in FIG. 1. The screw compressor according to this embodiment is configured in a manner similar to the screw compressor according to the third embodiment, except that the configuration of a working chamber closing unit 40 is different.

Practically, with the screw compressor according to this embodiment, a working chamber closing unit 40 with the same length in the rotor shaft direction as that of the working chamber closing unit 16 is formed integrally with a main casing 10Z at the same position as that of the conventional working chamber closing unit 16 described earlier with reference to FIG. 6.

This working chamber closing unit 40 has a male-rotor-side recess 40A and a female-rotor-side recess 40B which are formed at a side part on the male rotor 2 side and a side part on the female rotor 3 side, respectively, so that they extend from an end of the motor 9A (FIG. 1) side in the rotor shaft direction and reach the rotor-facing surface.

Then, by forming the male-rotor-side recess 40A and the female-rotor-side recess 40B in the working chamber closing unit 40 as described above, a male-rotor-side open space 41A is formed between the male-rotor-side recess 40A and the suction-side shaft 2B of the male rotor 2 and a female-rotor-side open space 41B is formed between the female-rotor-side recess 40B and the suction-side shaft 3B of the female rotor 3.

In this case, the diameter of the male-rotor-side recess 40A or the female-rotor-side recess 40B of the working chamber closing unit 40 is selected to be smaller than a root diameter of the male rotor 2 or the female rotor 3 and to be larger than the radius of the suction-side shaft 2B of the male rotor 2 or the suction-side shaft 3B of the female rotor 3 so that the working chamber can be closed.

Furthermore, the male-rotor-side recess 40A of the working chamber closing unit 40 is designed with its side face formed in an arc shape so that its curvature increases from an inlet side of the male-rotor-side open space 41A for the working medium, which flows into the male-rotor-side open space 41A as described later, towards its outlet side; and, therefore, a curvature of the male-rotor-side open space 41A increases towards the rotation direction of the suction-side shaft 2B of the male rotor 2.

Similarly, the female-rotor-side recess 40B of the working chamber closing unit 40 is designed with its side face formed in an arc shape so that its curvature increases from an inlet side of the female-rotor-side open space 41B for the working medium, which flows into the female-rotor-side open space 41B as described later, towards its outlet side; and, therefore, a curvature of the female-rotor-side open space 41B increases towards the rotation direction of the suction-side shaft 3B of the female rotor 3.

With the screw compressor according to this embodiment having the above-described configuration, the working medium which has flown through the space part of the suction space 13 (FIG. 1 and FIG. 2) existing outside the suction-side shaft 2B of the male rotor 2 collides against the side face of the working chamber closing unit 40, then passes through the male-rotor-side open space 41A, flows within the suction space 13 and within the male-rotor-side open space 41A as if rotating around the suction-side shaft 2B of the male rotor 2 in the same direction as the rotation direction of the suction-side shaft 2B (the rotation direction indicated with arrow a), and is eventually sucked into the working chamber through the suction port 50.

Similarly, with this screw compressor, the working medium which has flown flows through the space part of the suction space 13 existing outside the suction-side shaft 3B of the female rotor 3 collides against the side face of the working chamber closing unit 40, then passes through the female-rotor-side open space 41B, flows within the suction space 13 and within the female-rotor-side open space 41B as if rotating around the suction-side shaft 3B of the female rotor 3 in the same direction as the rotation direction of the suction-side shaft 3B (the rotation direction indicated with arrow b), and is eventually sucked into the working chamber through the suction port 50.

The screw compressor according to this embodiment is configured as described above, in a manner similar to that of the screw compressors according to the second and third embodiments, so that the male-rotor-side open space 41A and the female-rotor-side open space 41B are separated from each other; and, therefore, it exhibits the effect of rectifying the working medium which flows within, for example, the suction space 13 along with the rotations of the male rotor 2 and the female rotor 3.

Consequently, if the screw compressor according to this embodiment is employed, the working medium sucked through the suction opening 12 (FIG. 1) has lower flow resistance than that of the conventional screw compressor and the suction of the working medium into the working chamber is performed smoothly. Accordingly, when the male rotor 2 and the female rotor 3 rotate at a high speed, the speed is not decelerated when the working medium flows into the working chamber; and, therefore, energy efficiency of the screw compressor can be enhanced by suppressing the energy for accelerating the working medium. Also, when the male rotor 2 and the female rotor 3 rotate at a low speed, the flow rate of the working medium can be increased along with a reduction of the suction resistance of the working medium.

In addition, with this screw compressor, a side-face shape of the male-rotor-side recess 40A and a side-face shape of the female-rotor-side recess 40B of the working chamber closing unit 40 are formed in a cylindrical shape whose curvature on the outlet side of the male-rotor-side open space 41A or the female-rotor-side open space 41B is larger than that on its inlet side in a manner similar to the third embodiment, so that the speed of the working medium which flows out of the outlet side of the male-rotor-side open space 41A or the female-rotor-side open space 41B to, for example, the suction space 13 can be increased and the acceleration loss of the working medium can be reduced.

Furthermore, with this screw compressor, the side-face shape of the male-rotor-side recess 40A and the side-face shape of the female-rotor-side recess 40B are formed in a substantially cylindrical shape, so that processing of the working chamber closing unit 40 is facilitated, thereby making it possible to improve manufacturing efficiency of the screw compressor and reduce manufacturing cost.

(5) Other Embodiments

Incidentally, the aforementioned first to fourth embodiments have described the case where the present invention is applied to the screw compressor 1 in which the number of lobes of the lobe unit 2A for the male rotor 2 is four and the number of lobes of the lobe unit 3A for the female rotor 3 is six; however, the present invention is not limited to this example and can be applied to a wide variety of screw compressors with other various configurations.

Moreover, the aforementioned first to fourth embodiments have described the case where each of the depressions 14C, 14D, 20D, 20E, 30D, 30E, 40A, 40B in the working chamber closing member 14 or the working chamber closing units 20, 30, 40 is formed in the arc shape which is coaxial with the male rotor 2 and the female rotor 3; however, the present invention is not limited to this example and the above-described depression 14C, 14D, 20D, 20E, 30D, 30E, 40A, 40B may be of an arc shape which is not coaxial with the male rotor 2 or the female rotor 3, or may be of any shape other than the arc shape.

Furthermore, the aforementioned first embodiment has described the case where the motor-side open space 15C is provided on the motor 9A side of the working chamber closing member 14 and the male-rotor-side open space 15A and the female-rotor-side open space 15B are provided on the side part of the working chamber closing member 14; and the second and third embodiments have described the case where the first and second male-rotor-side open spaces 21A, 21B are provided on the male rotor 2 side of the working chamber closing unit 20, 30 and the first and second female-rotor-side open spaces 22A, 22B are provided on the female rotor 3 side of the working chamber closing unit 20, 30. However, the present invention is not limited to this example and, for example, in the first embodiment, the motor-side open space 15C and either the rotor-side open space 15A or the female-rotor-side open space 15B may be provided; and in the second and third embodiments, only the first male-rotor-side open space 21A and the first female-rotor-side open space 22A may be provided. Incidentally, the case where only the second male-rotor-side open space 21B and the second female-rotor-side open space 22B are provided in the second and third embodiments is the fourth embodiment.

INDUSTRIAL AVAILABILITY

The present invention can be applied to screw compressors with a wide variety of configurations.

REFERENCE SIGNS LIST

1: screw compressor
2: male rotor
2A, 3A: lobe unit
2B, 3B: suction-side shaft
2C, 3C: delivery-side shaft
3: female rotor
4: casing
9: drive unit
9A: motor
10, 10X to 10Z: main casing
10A, 10AX to 10AZ: bore
12: suction opening
13: suction space
14: working chamber closing member
14C, 14D, 20D, 20E, 30D, 30E, 40A, 40B: depression
15, 21, 22, 31, 32: open space
15A, 21A, 21B, 31A, 31B, 41A: male-rotor-side open space
15B, 22A, 22B, 32A, 32B, 41B: female-rotor-side open space
15C: motor-side open space
20, 30, 40: working chamber closing unit
20A, 30A: male-rotor-side recess
20B, 30B: female-rotor-side recess
20C: isolation wall

The invention claimed is:

1. A screw compressor for compressing a working medium sucked through a suction opening and discharging the compressed working medium through a delivery opening, the screw compressor comprising:

a male rotor and a female rotor that rotate while meshing with each other;

a casing that houses the male rotor and the female rotor and is provided with a bore which forms a working chamber, that together with the male rotor and the female rotor, compress the working medium;

a drive unit that rotationally drives the female rotor;

a working chamber closing member that forms a suction port for sucking the working medium into the working chamber received through the suction opening and closes off the working chamber when the working chamber reaches a maximum capacity; and a suction space that connects the suction opening and the suction port to allow the sucked working fluid to flow therethrough to the suction port, the suction space including an open space that is provided adjacent the working chamber closing member between a shaft of the male rotor and a shaft of the female rotor on an opposite axial side of the male rotor and the female rotor relative to the suction port;

wherein the open space is divided into and provided as the male rotor's side and the female rotor's side; and wherein the open space is formed so that the working medium which flows through outside the shaft of the male rotor in the suction space flows into the open space on the male rotor's side and the working medium which flows through outside the shaft of the female rotor in the suction space flows into the open space on the female rotor's side.

2. The screw compressor according to claim 1, wherein each of the male rotor and the female rotor has a lobe unit provided with a plurality of spirally extending lobes and is housed in the bore in the casing in a state where the lobes of the lobe unit mesh with each other; and wherein the suction port is provided on a plane surface including an end face of the lobe unit of the male rotor and the lobe unit of the female rotor on an opposite side of a delivery opening via the male rotor and the female rotor in an axial direction of the male rotor and the female rotor.

3. The screw compressor according to claim 1, wherein the suction space is separated into and provided as the male rotor's side and the female rotor's side; and wherein the open space is formed so that the working medium which is sucked through the suction opening passes through the open space and flows through an outside of the shaft of the male rotor and the working medium which is sucked through the suction opening passes through the open space and flows through an outside the shaft of the female rotor.

4. A screw compressor for compressing a working medium sucked through a suction opening and discharging the compressed working medium through a delivery opening, the screw compressor comprising:

a male rotor and a female rotor that rotate while meshing with each other;

a casing that houses the male rotor and the female rotor and is provided with a bore which forms a working chamber, that together with the male rotor and the female rotor, compress the working medium;

a drive unit that rotationally drives the female rotor;

a working chamber closing member that forms a suction port for sucking the working medium into the working chamber received through the suction opening and closes off the working chamber when the working chamber reaches a maximum capacity; and a suction space that connects the suction opening and the suction port to allow the sucked working fluid to flow therethrough to the suction port, the suction space including an open space that is provided adjacent the working chamber closing member between a shaft of the male rotor and a shaft of the female rotor on an opposite axial side of the male rotor and the female rotor relative to the suction port;

wherein the open space is divided into and provided as the male rotor's side and the female rotor's side; and wherein both the open space on the male rotor's side and the open space on the female rotor's side are formed to have a curved portion which communicates with an inner wall surface of the bore as viewed from a rotor shaft direction of the male rotor and the female rotor.

5. A screw compressor for compressing a working medium sucked through a suction opening and discharging the compressed working medium through a delivery opening, the screw compressor comprising:

a male rotor and a female rotor that rotate while meshing with each other;

a casing that houses the male rotor and the female rotor and is provided with a bore which forms a working chamber, that together with the male rotor and the female rotor, compress the working medium;

a drive unit that rotationally drives the female rotor;

a working chamber closing member that forms a suction port for sucking the working medium into the working chamber received through the suction opening and closes off the working chamber when the working chamber reaches a maximum capacity; and a suction space that connects the suction opening and the suction port to allow the sucked working fluid to flow therethrough to the suction port, the suction space including an open space that is provided adjacent the working chamber closing member between a shaft of the male rotor and a shaft of the female rotor on an opposite axial side of the male rotor and the female rotor relative to the suction port;

wherein the working chamber closing member is provided between the shaft of the male rotor and the shaft of the female rotor and the open space is separated into the male rotor's side and the female rotor's side; and wherein an arc-shaped first depression which has a diameter larger than that of the shaft of the male rotor is formed in the working chamber closing member at a position opposite the shaft of the male rotor and an arc-shaped second depression which is coaxial with the female rotor and has a diameter larger than that of the shaft of the female rotor is formed in the working chamber closing member at a position opposite the shaft of the female rotor.

6. The screw compressor according to claim 5, wherein the first depression is formed in an arc shape which is centered at a center of the shaft of the male rotor; and wherein the second depression is formed in an arc shape which is centered at a center of the shaft of the female rotor.

7. The screw compressor according to claim 5, wherein at least one of the first depression and the second depression is formed so that its curvature becomes larger towards a rotational direction of the shaft of the male rotor or the shaft of the female rotor which is located opposite the first depression or the second depression.

8. The screw compressor according to claim 5, wherein a radius of the first depression and the second depression is selected to be smaller than a root diameter of the male rotor and the female rotor and to be larger than a radius of the shaft of the male rotor and the female rotor.

* * * * *